Figure 1:
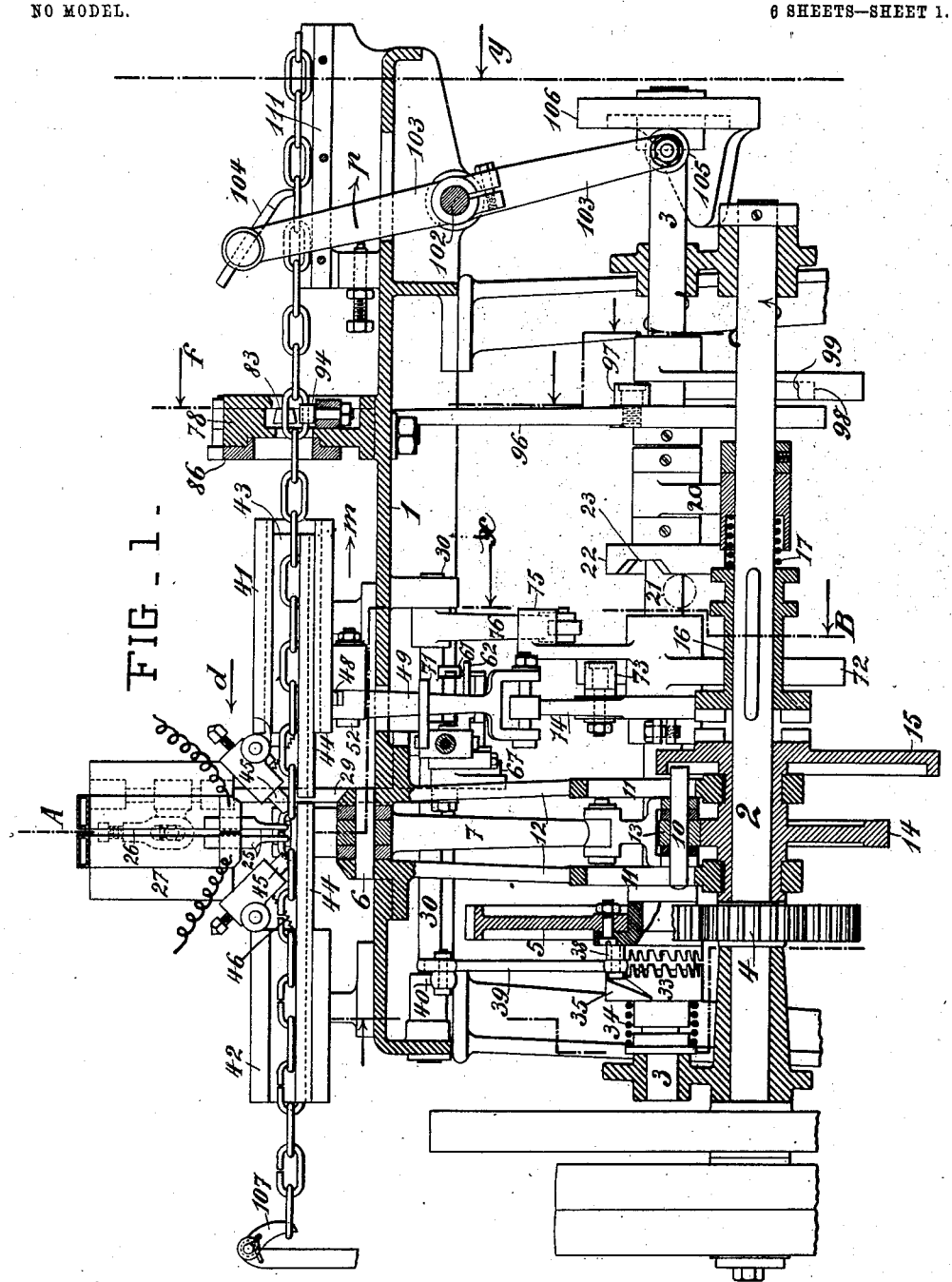

No. 728,119. PATENTED MAY 12, 1903.
C. A. LEUENBERGER.
AUTOMATIC ELECTRIC CHAIN WELDING MACHINE.
APPLICATION FILED AUG. 28, 1902.
NO MODEL. 6 SHEETS—SHEET 1.

Witnesses:
Inventor
Carl Albert Leuenberger
by Henry Connett
Attorney

No. 728,119. PATENTED MAY 12, 1903.
C. A. LEUENBERGER.
AUTOMATIC ELECTRIC CHAIN WELDING MACHINE.
APPLICATION FILED AUG. 28, 1902.
NO MODEL. 6 SHEETS—SHEET 2.
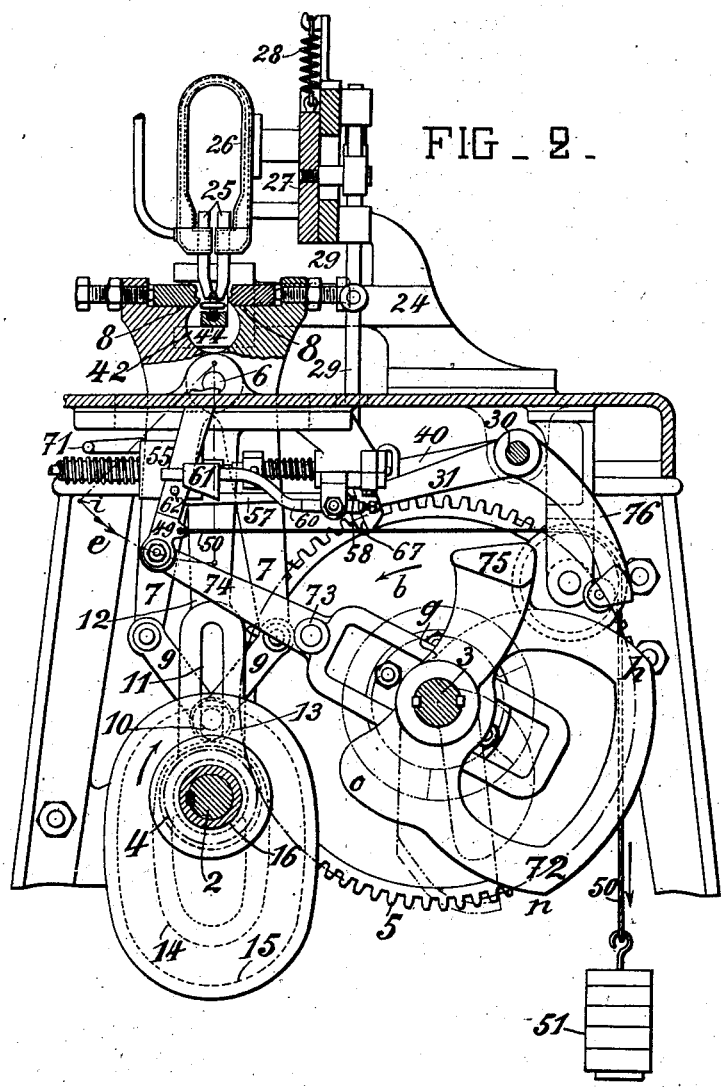
FIG_2_
Witnesses:
J. H. Kliman
Peter A. Ross
Inventor:
Carl A. Leuenberger
by Henry Connett
Attorney No. 728,119. PATENTED MAY 12, 1903.
C. A. LEUENBERGER.
AUTOMATIC ELECTRIC CHAIN WELDING MACHINE.
APPLICATION FILED AUG. 28, 1902.
NO MODEL. 6 SHEETS—SHEET 3.
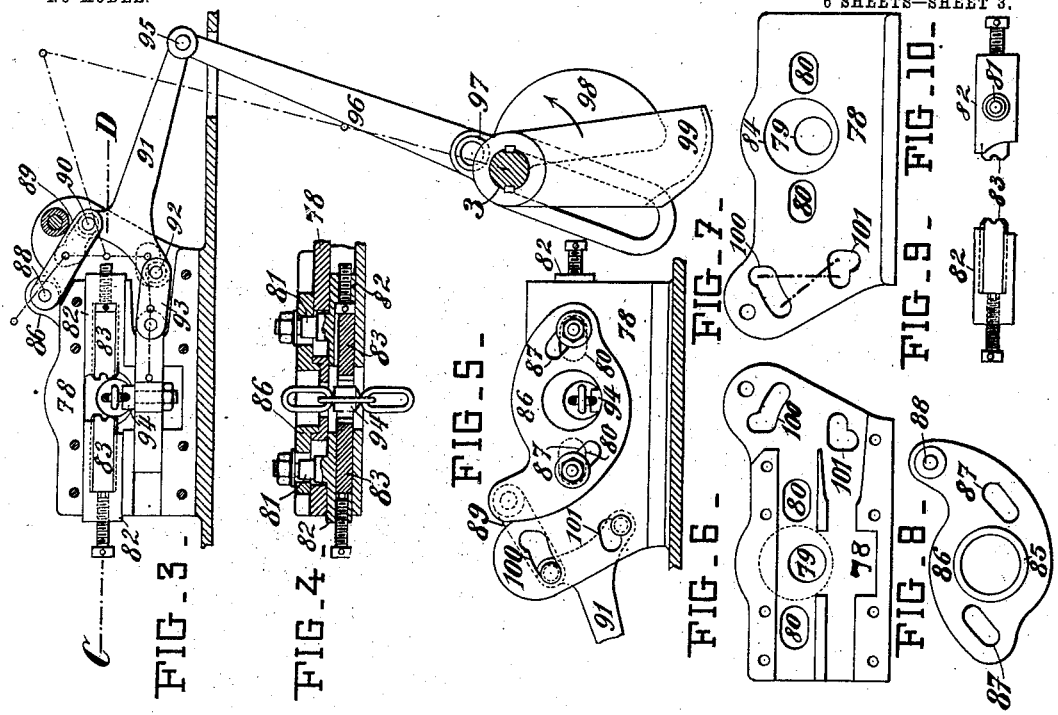

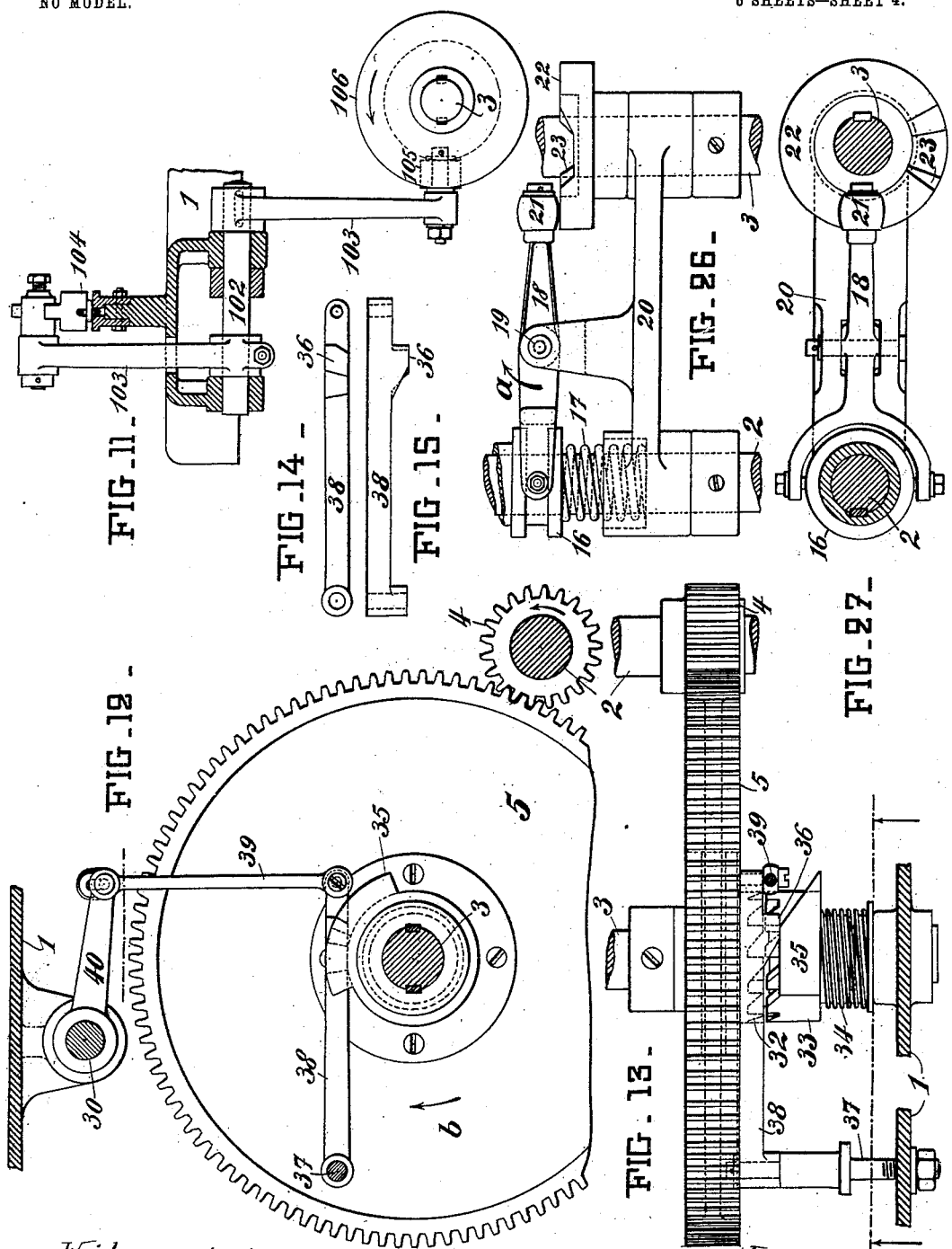

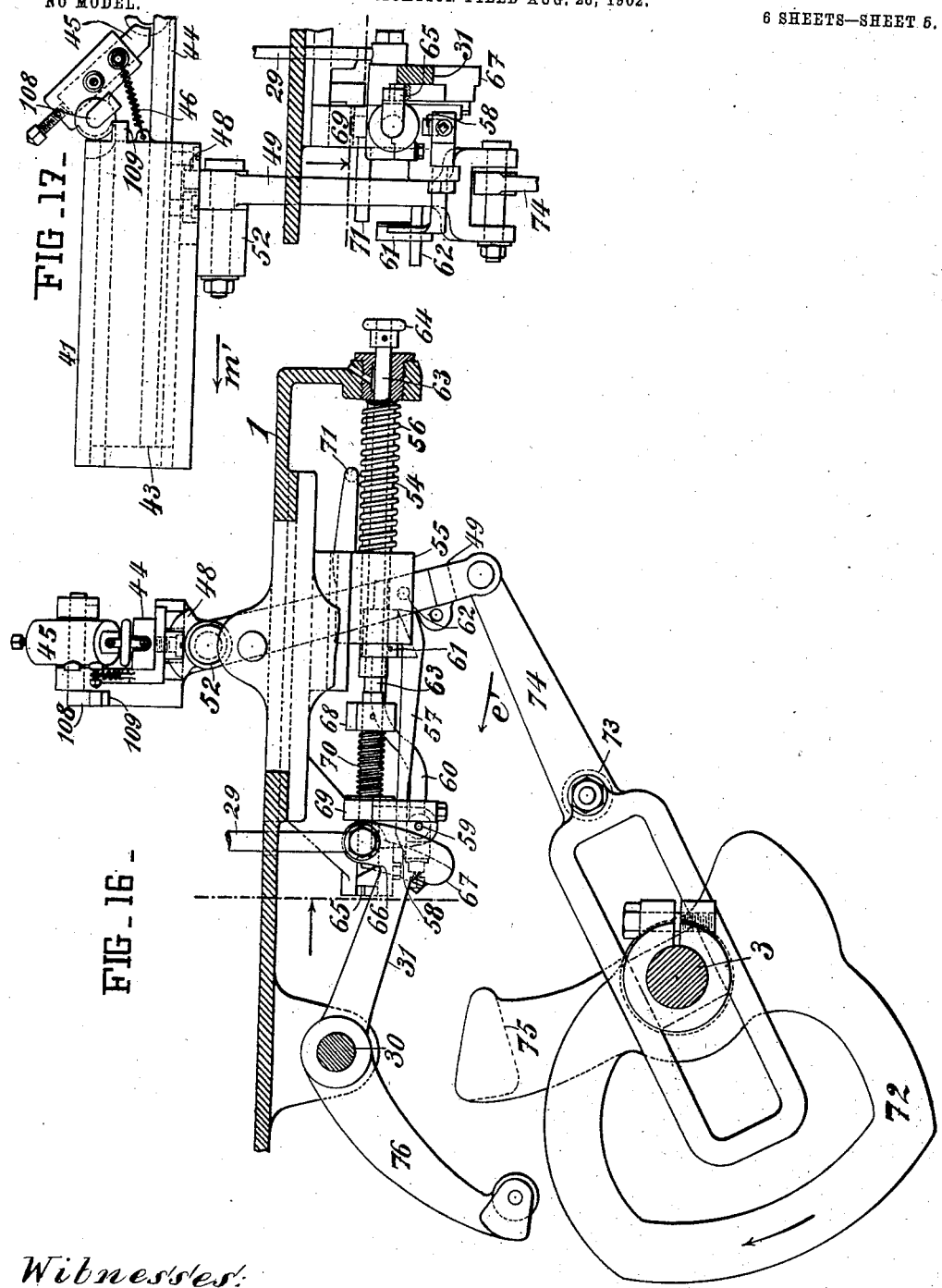

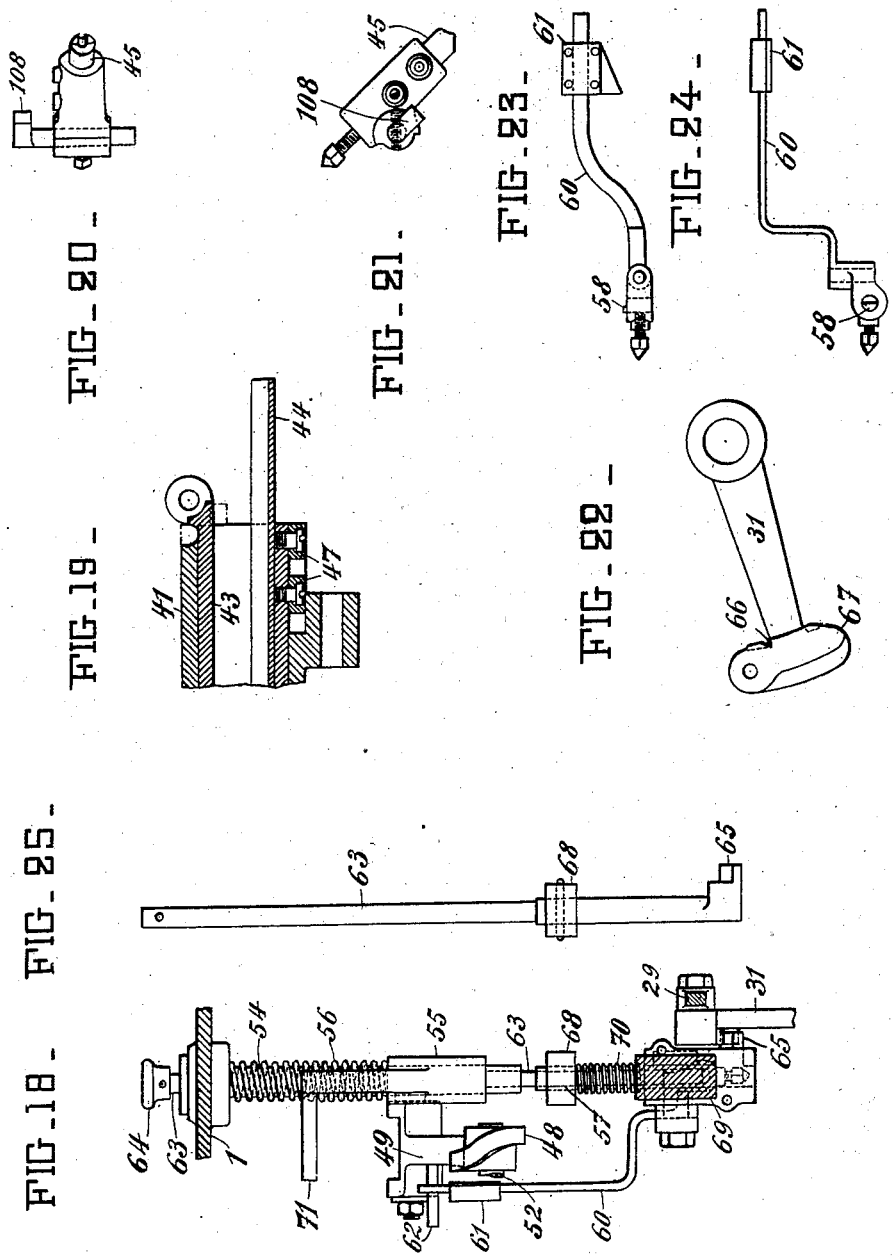

No. 728,119. Patented May 12, 1903.

UNITED STATES PATENT OFFICE.

CARL ALBERT LEUENBERGER, OF BIEL, SWITZERLAND, ASSIGNOR TO THE FIRM OF "UNION," OF BIEL, SWITZERLAND.

AUTOMATIC ELECTRIC CHAIN-WELDING MACHINE.

SPECIFICATION forming part of Letters Patent No. 728,119, dated May 12, 1903.

Application filed August 28, 1902. Serial No. 121,302. (No model.)

*To all whom it may concern:*

Be it known that I, CARL ALBERT LEUENBERGER, a citizen of the Republic of Switzerland, and a resident of Biel, canton of Berne, Switzerland, have invented new and useful Improvements in Automatic Electric Chain-Welding Machines, of which the following is a full, clear, and exact specification.

This invention relates to an automatic electric chain-welding machine.

The method of welding the links of chains by electricity is well known. The chief difficulty which is experienced with existing machines consists in the fact that the time allowed for the welding depends upon the judgment of the person who is operating the machines and that thus the strength of the weld is influenced by variations in the thickness of the links of the chain, the distance of the link ends to be welded, and so on.

The subject of the present invention is a welding-machine distinguished, essentially, from the existing methods of construction by the following features: Instead of allowing the length of the period allowed for welding to be determined by the judgment of the operator, in this case conversely, as it may be said, every movement of the machine is made dependent (except the driving movement) upon the welding temperature in such a way that when the welding heat has been attained and the glowing ends of the link have been amalgamated by the pressing-jaws this movement of pressure is made use of to effect the return of the welding-electrodes to their position of rest and automatically to bring about the further sequence of processes—pressure of the weld, removal of the pressure-bur, and shifting of the chain.

The accompanying drawings illustrate a suitable method of construction of the chain-welding machine for carrying out this invention.

Figure 1 is a front elevation, partially in section. Fig. 2 is a section along the line A B of Fig. 1 looking in the direction of the arrow *x*. Fig. 3 is an elevation of a shearing device for taking off the bur from the chain, links after welding and pressing, this view being taken in the arrow *f* of Fig. 1. Fig. 4 is a horizontal section on line C D of Fig. 3. Fig. 5 shows the back of the proper shearing mechanism of this device. Figs. 6 and 7 show an upright support thereof seen from both sides. Fig. 8 represents a rocking piece, and Figs. 9 and 10 show two shearing-tools and their holders. Fig. 11 is a sectional elevation of the means for shifting the chain looking in the direction of the arrow *y*, Fig. 1. Fig. 12 shows the mechanism for transferring the power from the driving-shaft of the machine to a so-called "working shaft"— *i. e.*, a shaft which in a single revolution brings in proper succession all the parts of the machine into action—with a coupling for arresting the rotation of the working shaft during the period of welding. Fig. 13 is a plan view of this mechanism. Fig. 14 is a side elevation, and Fig. 15 a plan, of a disengaging-lever for the coupling of said mechanism. Fig. 16 shows, on an enlarged scale, the device for the intermittent locking of the welding-electrodes in the contact position in combination with a releasing device connected with one of the pressure-jaws. Fig. 17 is an elevation of the proper locking mechanism and some parts connected therewith. Fig. 18 is a plan, partly in section, of this locking mechanism. Fig. 19 is a vertical section through one of the chain-guides and its support. Fig. 20 is a plan, and Fig. 21 a side view, of one of the pressure-jaws. Fig. 22 shows separately a connecting-lever rigidly connected to the welding-electrodes. Fig. 23 is a side elevation, and Fig. 24 a plan, of a locking-lever of the said locking mechanism. Fig. 25 shows separately a sliding spur-bolt coöperating with the connecting-lever shown in Fig. 22, so as to engage a recess thereof when the electrodes occupy their contact position. Fig. 26 is a plan, and Fig. 27 a sectional elevation, of the actuating device of a coupling for throwing the pressing mechanism into and out of gear at the proper time.

The frame of the machine 1 carries an upper table, and on its lower part, in front, the driving-shaft 2 is arranged, with its fast and loose pulleys, and farther back the working shaft 3. The shaft 2 can transfer its rotation to the working shaft 3 by means of diminishing toothed gear 4 5.

On the table of the machine two jointed levers 7 are mounted on the pin 6, so as to be capable of being oscillated, and on the upper ends of these levers two adjustable and removable pressure-jaws 8 are seated, Fig. 2, the latter being provided with a horizontal groove of suitable form in order that during the position of closure of the jaws (the pressing position of the jointed levers) they may grip and compress like claws the welded point of the link which has just undergone the welding operation. The lower ends of the jointed levers 7, Figs. 1 and 2, are connected by the toggles 9 9 to a common pin 10, which is arranged to slide up and down in the grooves 11 of two fixed guides 12 vertically. The pin 10 carries a roller 13, which runs on the periphery of a non-circular pressure-disk 14, which is mounted freely upon the driving-shaft 2 and is so constructed that when rotating it closes and then opens the pressure-nipper 7 8. A grooved disk 15, connected to the pressure-disk, serves to force the sliding bolt 10 back into position. This arrangement for pressing comes into action immediately after the welding has been effected while the welded point of the link is still red-hot. During the welding period it is thrown out of action by a coupling which is slackened. The hub of the pressure-disk is furnished with claws, and a coupling-box 16, provided with claws also, sits upon the shaft 2 in such a way as to be able to be shifted longitudinally by means of a feather and groove and which is made to engage at the proper time by means of a spring 17, but is ordinarily prevented from doing so by a throw-out lever 18, Figs. 26 and 27. This lever 18, which is attached (so as to be able to oscillate) at 19 to a bridge 20, connecting the two shafts 2 3, engages by its one forked end with the grooved coupling-box 16, while its other end carries a roller 21, which passes over the surface of a cam-disk 22, set fast upon the working shaft 3. Usually the roller is in contact with the raised part of the cam of the disk 22; but as soon as the working shaft 3 is set in action, close upon the commencement of its rotation the depression 23 of the cam of the disk 22 comes to lie underneath the roller 21, and the lever 18 is allowed to turn in the direction of the arrow $a$, and the coupling-spring 17 brings the coupling-box 16 into engagement with the hub of the pressure-disk, so that the driving-shaft 2 carries the pressure-disk around as it rotates itself to set the pressing mechanism in action for the purpose described. As soon as the working shaft 3 has made a portion of a rotation, the driving-shaft having meanwhile not yet completed one, the roller 21 again mounts the raised portion of the cam on the disk 22, thus causing the throw-out lever 18 to be pressed back and the pressure-disk or pressing mechanism to have its coupling released.

To the table of the machine is attached a carrier 24 for the welding mechanism and for guiding the chain. The welding mechanism consists of two pairs of electrodes 25, which grip the link to be welded in the welding position on both sides of the contact ends of the link like a pair of tongs, so that the circuit is closed at this point by the link. The electrodes 25 are placed in pairs on horseshoe-shaped spring-holders constructed to be cooled by water, and these electrode-holders are carried by a slide 27, able to move vertically, the slide being constantly pulled upward by a spring 28. The electrode-slide 27 is connected by a rod 29 with a lever-arm 31, directed forward and set on an auxiliary spindle 30, this arm being able to be fixed in its position corresponding to the welding position of the electrodes by a locking mechanism hereinafter to be described. This position of the parts is shown in Figs. 1 and 2. When the locking mechanism is opened, the lever-arm 31 is set free and the spring 28 instantly draws the electrodes 25 out of their position of contact.

The toothed wheel 5, which constantly runs with the driving-wheel 4, runs loose upon the working shaft 3, but can be connected with it by a clutch-coupling as soon as the welding has been effected and the other operations are to succeed it. During the welding period the working shaft 3 is at rest, since this coupling is free. This latter consists of a half-coupling 32, connected with the toothed wheel 5, and a half-coupling 33, sliding along the working shaft 3 by means of a feather and groove and operated by a spring 34. This coupling is shown on a larger scale than the other figures in Figs. 12 and 13. The shifting-coupling 33 has an oblique nose 35, which coöperates with a similar oblique nose 36 on a lever 38, pivoted to the frame of the machine at 37 (this lever being shown separately in Figs. 14 and 15) in such a way that when this lever is at its lowest position and the working shaft (the coupling being thrown into gear) turns in the direction of the arrow $b$, Fig. 12, the nose 35 comes into contact with the nose 36 of the lever 38 when the shaft has rotated once, and thereby the half-coupling 33 is pushed back against the spring 34 and the coupling released. This is the position of the parts in the drawings, and they maintain it until the welding has been effected and the electrodes are lifted, for the lever 38 is by means of a rod 39 and a lever-arm 40, also directed forward, positively connected with the spindle 30 of the welding mechanism, so that when the electrodes are raised the lever 38 is also raised, and the coupling-spring 34 is thus allowed to throw the coupling into gear.

The chain-guiding mechanism here consists of two beds 41 42, arranged on either side of the pressing-jaws, which are open forward, so that the chain to be welded may simply be laid into these beds from the front.

The bed 41 (on the right in Fig. 1) is furnished with a slide 43, and not only this slide but also the left bed 42 are possessed of guides 44, lying in one and the same straight line, each having a groove for the vertically-placed links of the chain, while the links which lie horizontally rest upon the upper edges of the guides. The fixed guide 44 (that in the bed 42) extends to a point situated beyond the vertical plane of symmetry of the pairs of electrodes, so that the link to be welded is held firmly at the working point. The bed 42 and its slide 43 carry at the ends which are turned toward each other each a pivoted pressure-jaw 45, which can move upward and which is drawn down by a spring 46. These jaws 45 grip the link to be welded firmly between them, the slide 43 with a pressure in the direction of the arrow $d$, Fig. 1, thus allowing of the amalgamation of the ends of the link which are in contact. For this purpose the slide 43 has below two rollers 47, Fig. 19, between which is engaged a curved cam 48 on the hub of a lever 49, Figs. 16 to 18, pivoted at 52, and this lever 49 is further so connected with a cord, chain, or the like 50, carrying a counterpoise 51, that the lever tends to turn in the direction of the arrow $e$, Fig. 2. By the cam 48 of the lever 49 the pull of the weight 51 upon the lever 49 is changed into a pressure upon the slide 43. Usually, however, movement of the slide in response to this pressure is prevented by resistance of the link which is gripped between the pressure-jaws. Only when during the welding the contact ends of the link are sufficiently heated does the latter yield under the pressure of the weight 51, so that as the ends amalgamate the slide 43 moves slightly to the left, and the lever 49 is rotated to a certain extent in the direction of the arrow $e$, Fig. 2. This rotation of the lever 49 is utilized to unlock the locking mechanism for the welding-electrodes, which has been mentioned, so that the electrodes may rise, thus breaking the current, and simultaneously by the rise of the lever 38 therefrom resulting, the couplings 32 33 for the working shaft are caused to engage.

The locking mechanism mentioned above is constructed as follows: The details will be well seen on reference to Figs. 16 to 18. A pusher 55 is made to slide upon a hollow rod 54 by the action of a pressure-spring 56 under the table of the frame of the machine. This pusher has a finger 57 at its rear end, which finger catches (in the locking position of the locking mechanism) on the tooth 58 of a locking-lever 60, which is pivoted at 59, (shown separately in Figs 23 and 24,) and then keeps the pressure-spring 56 taut. The locking-lever 60 has in front an oblique lifting-piece 61, against which when the lever 49 turns sufficiently far in the direction of the arrow $e$, Fig. 2, or $e'$, Fig. 16, a releasing-pin 62 (attached to it) strikes, raising the locking-lever 60 slightly in front and freeing the tooth 58 of the latter from the finger 57 of the pusher. Inside the hollow rod 54 is a bolt 63, with a pressure-knob 64, and this bolt slides in the rod and has at its rear end a spur 65, which, as shown in the drawings, comes to lie in a recess 66 of the head 67 of the lever 31 and completes the locking. This bolt (shown in detail alone in Fig. 25) has a collar 68, and between the latter and the guide 69 a returning-spring 70 is interposed. If now the locking-lever 60 be released by the pin 62 of the releasing-lever 49, the pusher 55, under the impulse of the spring 56, is forced against the collar 68 of the bolt 63, so that the latter is pushed back and its spur 65 is lifted out of the recess 66 in the head of the lever 31. The latter is thus set free, and the electrodes are able to be raised by the action of the spring 28, Fig. 2. If the releasing-lever 49 be turned back in a direction opposite to that of the arrow $e'$, then by means of the catch-pin 71 it carries the pusher 55 back to its initial position, compressing the spring 56 at the same time, so that the finger 57 again catches the locking-tooth 58 of the locking-lever 60, which is left to itself and falls in front. This return of the releasing-lever is brought about by a specially-shaped cam 72, attached to the working shaft 3, which cam acts upon a roller 73, mounted upon a slotted link 74, connected to the lever 49, and comes into play, as hereinafter described, when the working shaft is in gear. This cam has a wedge-shaped finger 75, which may strike on the roller of a lever-arm 76 on the spindle 30 of the welding mechanism, so as to lift it, depress the lever 31, and move the electrodes down. During this action the head 67 of the lever 31 slides over the spur 65 of the bolt 63 of the locking mechanism, pulling the spur back and finally allowing it to drop into the recess 66 of the head 67. By this action the lever 31 is locked again, and the electrodes are at the same time secured in the contact position. Fig. 22 shows separately the lever 31 with head 67 and recess 66.

When the amalgamated surfaces of the joint are pressed together by the pressure-cheeks 8 of the pressure-nipper 7 8, a bur of course arises above and below. In order to remove this bur automatically, the following shearing mechanism is provided, (see separately Figs. 3 to 10:) Fig. 3 is a plan of this arrangement in the direction of the arrow $f$ of Fig. 1. Fig. 4 is a horizontal section along the line C D of Fig. 3, and Fig. 5 is a plan as seen from the other side, while Figs. 6 to 10 serve to show the important parts of this mechanism separately. A flat upright 78 rises from the table of the machine, as shown separately in Figs. 6 and 7 from both sides, with a central aperture for the passage of the chain and two elongated horizontal slots 80, both placed at the same height for two pins 81 of movable holders 82 for a shearing-tool 83, Figs. 9 and 10. These tools are adjustable in the holders 82 and in the position of apposition grip the welded point of the link-like claws. A circular recess 84 in the bracket 78 carries the hollow hub 85 of a rocking piece 86, the form of the latter being best shown in Figs. 5 and 8.

This rocking piece has two slots 87, placed obliquely to the slots 80 and diametrically opposed to each other, through which the pins 81 also pass. Above at 88, Fig. 3, the rocking piece is connected by the connecting-rod 89 with the pin 90 of an elbow-lever 91, from which another pin 92 is connected by the connecting-rod 93 with a shifting socket 94, placed at right angles to the direction of the chain and in which the link to be shaped is held upright. The third pin 95 of the elbow-lever 91 connects this with a grooved link 96, which embraces the working shaft, carries a roller 97, and is able to be shifted by a semicircular finger 98, placed upon the shaft 3 and combined with a cam 99, having a flange to engage the roller 97 for the purpose of returning the link 96 to its original position. The bracket 78 is further provided with two peculiarly-shaped openings 100 and 101, Figs. 6 and 7. In the position of rest the pin 90 of the elbow-lever 91 lies at the lowest point of the opening 100 and the pin 92 at the lowest point of the opening 101. If now the link 96 be raised by the lifting-finger 98, the elbow-lever 91 is first rotated on the pin 92 as its axis of rotation, and the rocking piece 86 is rocked at the same time. Since the slots 87 in the latter are placed obliquely to those 80 of the fixed bracket 78, the pins 81 are brought nearer to each other, and the shearing-tools 83 are also approximated. At the instant when the latter embrace the welded point of the link the pin 90 of the elbow-lever lies in the upper bay of the opening 100 and now acts as a point of rotation. A further rise of the grooved link 96 then brings the pin 92 of the elbow-lever 91 into the lateral bay of the opening 101 and causes the withdrawal of the socket 94. The result of this is that the portion of the link gripped by the shearing-tools 83 is somewhat turned inside them, and so the bur above and below is removed by their cutting edges. If, then, the roller 97 of the grooved link 96 runs down over the radially-directed back face of the finger 98 as the result of gravity, with the assistance at first of the returning cam 99, it will be readily understood that the various members of this apparatus quickly return to their initial positions. The motion of advance of the chain, which at this point is supported by a guide 111, is effected by means of a feed mechanism, Figs. 1 and 11, consisting of a lever 103, pivoted at 102 and having an upper feed-arm 104 and a lower roller 105, which applies itself to a cam 106, placed on the working shaft 3. A certain amount of tension is put upon the chain by a tension-finger 107, interposed in front of the chain-guiding mechanism and operated by a spring, this finger putting upon the chain after the feed so much tension that the fresh link which has come to the welding position is pressed close to the left jaw 45. The cam 106 is so constructed that each time it advances the chain by the length of two links. The reason for this is that only the vertically-placed links of the chain—i. e., every alternate link—can be dealt with by the machine. In order to deal with the others, the chain must after passing once through the machine be turned through ninety degrees and again laid in the guides in such a way that the contact-surfaces are above.

The general method of action of the machine is as follows: In the drawings it is assumed that the welding-electrodes are just lowered over the link to be welded, held between the pressure-jaws 45, and that the working shaft 3 is at rest, the coupling 32 33 being out of engagement. The driving-shaft 2 and toothed gears 4 5, whose directions of rotation are shown by the arrows in Fig. 2, alone continue in motion. The current passes through the contact-surfaces of the link, the spring action of the electrode-holders 26 insuring the close contact of the electrodes which embrace the link, and the link is raised to a glowing condition between the pairs of electrodes. As soon as the welding temperature is attained—that is to say, as soon as the metal has softened sufficiently to allow the material to be amalgamated—the link yields under the pressure in the direction of the arrow $d$, which the slide 43, carrying the right pressure-jaw, receives from the weight 51, and the contact-surfaces are pressed together so as to unite. As the result of this yielding the lever 49 turns in the direction of the arrow $e$, Fig. 2, and this movement automatically starts the further movements. As soon as—that is to say, near the end of the motion of the lever—the releasing-pin 62 of the lever 49 strikes against the lifting-piece 61 of the locking-lever 60 and lifts it the pusher 55, which has until then been locked, is set free, so that it is forced back against the collar 68 on the bolt 63 by the action of the spring 56 and disengages the spur 65 from the lever 31, as is best shown in Fig. 16. The welding-electrodes at once rise in consequence of the action of the spring 28 and at the same time the lever 39, following the movement, the couplings 32 33 for the working shaft 3 are made to engage. The working shaft 3 now begins to rotate, but much more slowly than the driving-shaft 2, and the combination of parts is so arranged that all the further actions comprised in a cycle are completed within the time of a single rotation of the working shaft 3. Shortly after the commencement of the rotation of the latter the roller 21 of the throwing-out lever 18, Figs. 26 and 27, has entered the depression 23 on the cam 22, so that the pressure-disk 14 is coupled up to the driving-shaft 2 and by its raising the bolt 10 the pressure-cheeks 8 of the pressure-nipper 7 7 are pressed against the welded and amalgamated point of the link, partly for the purpose of pressure and partly to equalize the diameter of this portion of the link. The driving-shaft 2 has not yet completed a revolution, when this coupling is disengaged again by the cam 22 to bring the pressing mechanism to the position of rest. In the meantime the cam 72 has turned so far that the roller 73 of the slotted link 74, which is connected with the releasing-lever 49, begins to ascend the running surface of the part $g\,h$ of the cam 72. By this part $g\,h$ the slotted link 74 is forced back, and therewith the releasing-lever 49 is turned back in a direction opposed to that of the arrow $e$. (The limit of the stroke of this lever 49 is marked $i$ in Fig. 2.) This backward motion of the lever 49 has several objects: First, the guide-slide 43 for the chain, as the result of the action of the cam 48 on the boss of the lever 49, engaged between the rollers 47 is shifted in the direction of the arrow $m$, Fig. 1, or $m'$, Fig. 17. The right pressure-jaw 45 partakes of this motion and causes a short lever-arm 108, Figs. 17, 20, and 21, fixed upon the pivot of the jaw, to strike against a fixed projection 109, Fig. 17, in such a way as to turn up the jaw to set free the welded link. Secondly, by means of the carrying-pin 71 the pusher 55, its spring being at the same time stretched, is brought back in the manner described to its initial position, in which it is secured by the locking-lever 60. In the interval the cam 98 of the shearing mechanism gradually comes into action, as already described, in such a way that the grooved link 96 is raised, the shearing-tools 83 pressed together, and the socket 94 is shifted, so that the bur of a previously-welded link is removed by the shearing-tools 83 thus brought into position.

While the roller 73 of the grooved link 74 runs on the part $h\,n$ of the cam 72, and thus the guide-slide 43 of the chain is advanced, (for the purpose of raising its pressure-jaw,) the feed mechanism acts the cam 106 forcing out the lever 103 in the direction of the arrow $p$ in Fig. 1 and advances the chain the extent of two links. The pressure-jaw 45 on the right side is meanwhile held up by the small lever 108, while the left jaw 45 is simply turned up by the feed of the chain itself, and as soon as the next link but one has taken up the welding position falls back behind it from the action of its spring 46. The roller 73 then passes along the part $n\,o$ of the cam 72, so that the lever 49 (in the direction of the arrow $e$) and the guide-slide 43 of the chain (in the direction of the arrow $d$) return to the extent required to allow the right pressure-jaw 45 to descend again and, together with the left jaw 45, embraces the link to be welded, which is now in position. A more extended movement of the slide 43 and its pressure-jaw under the action of the weight 51 is prevented by the resistance of the link which lies between the jaws 45. The lever 49 and the slotted link 74 then occupy again the positions shown in Fig. 2. The working shaft 3, with the cam 72, keeps on rotating, since it has not yet made a complete revolution. In the course of completing this the finger 75 reaches the roller of the lever 76 and so presses against it that the lever 31 is turned downward, and with it the electrodes 25 are lowered over the link, which is in position. When this occurs, the spur 65 of the bolt 63 of the locking mechanism falls automatically into the recess 66 in the head of the lever 31, thus securing the electrodes in their position of contact. In the descent of the electrodes the releasing-lever 38, which is connected with them by the spindle 30, has also descended and is now so placed that at the next instant the oblique nose 35 of the movable half-coupling 33 on the working shaft impinges on the oblique nose 36 of the lever 38, and by it the half-coupling 33 is pushed back. (See on this point the detailed Figs. 12 and 13.) The working shaft 3 is thereby thrown out or brought to rest, as required for the period of welding, which has just begun, and all parts of the machine are again in the initial position assumed in the foregoing description of their method of action. The same cycle is repeated as soon as the welding temperature is attained and the welding mechanism or the welding-electrodes are released by the lever 49, and the further operations are started by the throwing into gear of the working shaft 3 by means of the coupling 32 33.

What I claim is—

1. An automatic electric chain-welding machine, comprising means for holding the chain-link to be welded in position for welding, movable welding-electrodes, automatic means for conveying these latter into contact with the positioned link, means for setting this link under pressure so as to press together the link contact ends, and automatic means controlled by the yielding of the metal of the link when sufficiently softened by the welding heat for causing the electrodes to move out of their contact position as soon as the glowing link contact ends are duly amalgamated together.

2. An automatic electric chain-welding machine, comprising means for holding the chain-link to be welded in position for welding, movable welding-electrodes, automatic means for conveying these latter into contact with the positioned link, means for setting this link under pressure so as to press together the link contact ends, a mechanism for locking the electrodes in their contact position, automatic means controlled by the yielding of the metal of the link when sufficiently softened by the welding heat for unlocking the electrodes when the link ends are amalgamated together and automatic means for setting the electrodes out of contact with the link when it is welded.

3. An automatic electric chain-welding machine, comprising means for holding the chain-link to be welded in position for welding, movable welding-electrodes, automatic means for conveying these latter into contact with the positioned link, means for setting the link under pressure so as to press together the link contact ends, automatic means controlled by the yielding of the metal of the link when sufficiently softened by the welding heat for causing the electrodes to move out of their contact position, and a pressure mechanism for pressing the welded part of the positioned link, after welding.

4. An automatic electric chain-welding machine, comprising means for holding the link to be welded in position for welding, movable welding-electrodes, automatic means for conveying these latter into contact with the positioned link, means for setting this link under pressure so as to press together the link contact ends, automatic means controlled by the yielding of the metal of the link when sufficiently softened by the welding heat for causing the electrodes to move out of their contact position and an automatic device for shifting the chain to put another link into position for welding.

5. An automatic electric chain-welding machine, comprising means for holding the chain-link to be welded in position for welding, movable welding-electrodes, a working shaft, an intermediate mechanism connected therewith and adapted to control the electrodes so as to throw them into the contact position, means for setting the link under pressure so as to press the link contact ends together, a mechanism for locking the electrodes in their contact position, automatic means controlled by the yielding of the metal of the link when sufficiently softened by the welding heat for unlocking the electrodes, automatic means for setting these latter out of contact with the welded link, a coupling adapted to transfer the motive power to said working shaft when engaged, and a throw-in lever connected to the electrodes so as to cause the coupling to be closed when the electrodes are brought out of their contact position.

6. An automatic electric chain-welding machine, comprising means for holding the chain-link to be welded in position for welding, movable welding-electrodes, a working shaft, an intermediate mechanism connected therewith and adapted to control the electrodes so as to throw them into the contact position, means for setting the link under pressure so as to press the link contact ends together, a locking-bar for the electrodes, a pusher device adapted to push back this bar and thus to free the electrodes, a locking-lever for the pusher device, a releasing device for this locking-lever, put under the control of the yielding of the metal of the link when sufficiently softened by the welding heat, automatic means for setting the electrodes out of contact with the welded link, a coupling adapted to transfer the motive power to said working shaft when engaged, and a throw-in lever connected to the electrodes so as to cause the coupling to be thrown into gear when the electrodes are brought out of their contact position.

7. An automatic electric chain-welding machine, having means for holding the chain-link to be welded in position for welding, movable welding-electrodes adapted to embrace and grip the link ends to be welded together for the purpose of insuring the electric contact, automatic means for conveying the electrodes into contact with the positioned link; means for setting this link under pressure so as to press the link contact ends together, and automatic means controlled by the yielding of the metal of the link when sufficiently softened by the welding heat for causing the electrodes to move out of their contact position when the glowing link ends are duly amalgamated together.

8. An automatic electric chain-welding machine, having means for holding the chain-link to be welded in position for welding, two pairs of movable welding-electrodes, each pair being supported by a horseshoe-shaped spring-holder so as to allow the electrodes to grip the link ends on both sides of the joint, automatic means for conveying the electrodes into contact with the positioned link, means for setting this link under pressure so as to press the link contact ends together, and automatic means controlled by the yielding of the metal of the link when sufficiently softened by the welding heat for causing the electrodes to move out of their contact position when the glowing link ends are duly amalgamated together.

9. An automatic electric chain-welding machine, having movable welding-electrodes, automatic means for conveying them into contact with the link to be welded, gripping-jaws for holding the latter with a convenient pressure to press the link ends together, and automatic means controlled by the yielding of the metal of the link when sufficiently softened by the welding heat for causing the electrodes to move out of their contact position when the link ends are amalgamated together.

10. An automatic electric chain-welding machine, having movable welding-electrodes, automatic means for conveying them into contact with the link to be welded, gripping-jaws for holding this latter, a chain-guide on both sides of the electrodes, a pressure device for putting pressure upon the jaws which grip the link, and automatic means controlled by the yielding of the metal of the link when softened by the welding heat for causing the electrodes to move out of their contact position when the link ends are welded together.

11. An automatic electric chain-welding machine, having movable welding-electrodes, automatic means for conveying them into contact with the link to be welded, two gripping-jaws for holding this latter, a chain-guide adapted to support the link from below, a slide carrying one of said jaws the other being stationary, a shifting device for shifting this slide to put pressure upon the gripped link, and automatic means controlled by the yielding of the metal of the link when sufficiently softened by the welding heat for causing the electrodes to move out of their contact position when the link ends are welded together.

12. An automatic electric chain-welding machine, having movable welding-electrodes, automatic means for conveying them into contact with the link to be welded, a mechanism for locking the electrodes in their contact position, two pressure-jaws which grip the positioned link supported from below by a guide, a slide carrying one of the said jaws the other being stationary, a cam engaging with said slide, a loaded lever to move this cam so as to shift the slide and thus to put pressure upon the link while it is being welded, a releasing member carried by this lever and adapted to release said locking mechanism when the loaded lever has reached a predetermined limit at the end of the welding period, and automatic means for setting the electrodes out of contact with the link just welded.

13. An automatic electric chain-welding machine, having movable welding-electrodes, automatic means for conveying these latter into contact with the link to be welded, two horizontal beds supporting the chain on both sides of the electrodes, open forward so as to allow the chain to be simply laid therein from the front, means for setting the link under pressure so as to press the link contact ends together, and automatic means controlled by the yielding of the metal of the link when sufficiently softened by the welding heat for causing the electrodes to move out of their contact position when the link ends are amalgamated together.

14. An automatic electric chain-welding machine, having movable welding-electrodes, automatic means for conveying these latter into contact with the link to be welded, two horizontal beds supporting the chain on both sides of the electrodes, open forward so as to allow the chain to be laid therein from the front, grooved guide-bars arranged in said beds for guiding in their grooves the vertical links of the chain, means for setting the link under pressure so as to press the link ends together, and automatic means controlled by the yielding of the metal of the link when sufficiently softened by the welding heat for causing the electrodes to move out of their contact position when the link ends are amalgamated together.

15. An automatic electric chain-welding machine, comprising means for holding the chain-link to be welded in position for welding, movable welding-electrodes, automatic means for conveying these latter into contact with the positioned link, means for setting the link under pressure so as to press the link contact ends together, automatic means controlled by the yielding of the metal of the link when sufficiently softened by the welding heat for causing the electrodes to move out of their contact position, two nipper-levers having upper interchangeable pressure-cheeks for pressing the welded part of the positioned link, two links articulated at the lower ends of said nipper-levers and provided with a common sliding bolt, a pressure-disk engaging this sliding bolt to close said nipper-levers and a coupling arranged so as to be engaged with said pressure-disk when the welding has taken place, in order to set in action the said pressure-disk.

16. An automatic electric chain-welding machine, comprising means for holding the chain-link to be welded in position for welding, movable welding-electrodes, automatic means for conveying these latter into contact with the positioned link, means for setting this link under pressure so as to press the link contact ends together, automatic means controlled by the yielding of the metal of the link when sufficiently softened by the welding heat for causing the electrodes to move out of their contact position and an automatic shifting device for the chain, having a guide therefor, a lever with an upper shifting finger and a convenient cam actuating this lever.

17. An automatic electric chain-welding machine, comprising means for holding the chain-link to be welded in position for welding, movable welding-electrodes, automatic means for conveying these latter into contact with the positioned link, means for setting this link under pressure so as to press the link contact ends together, automatic means controlled by the yielding of the metal of the link when sufficiently softened by the welding heat for causing the electrodes to move out of their contact position, an automatic device for shifting the chain to put another link into position for welding, and a spring-controlled tension-finger adapted to exert a retractive action upon the chain.

In witness whereof I have hereunto signed my name in the presence of two subscribing witnesses.

CARL ALBERT LEUENBERGER.

Witnesses:
GEORGE GIFFORD,
AMAND RITTER.